(12) United States Patent
Norfleet et al.

(10) Patent No.: US 10,981,607 B2
(45) Date of Patent: Apr. 20, 2021

(54) TAILGATE LIFT HANDLE, LIFT ASSEMBLY, AND RELATED APPARATUS

(71) Applicant: Backsaver International, Inc., Somerset, KY (US)

(72) Inventors: Ralph Norfleet, Somerset, KY (US); Jason Norfleet, Somerset, KY (US)

(73) Assignee: BACKSAVER INTERNATIONAL, INC., Somerset, KY (US)

( * ) Notice: Subject to any disclaimer, the term of this patent is extended or adjusted under 35 U.S.C. 154(b) by 256 days.

(21) Appl. No.: 15/678,630

(22) Filed: Aug. 16, 2017

(65) Prior Publication Data

US 2017/0341687 A1 Nov. 30, 2017

Related U.S. Application Data

(63) Continuation of application No. 15/297,530, filed on Oct. 19, 2017, now Pat. No. 9,908,569.

(60) Provisional application No. 62/243,209, filed on Oct. 19, 2015, provisional application No. 62/280,406, filed on Jan. 19, 2016, provisional application No. 62/314,107, filed on Mar. 28, 2016, provisional application No. 62/400,373, filed on Sep. 27, 2016.

(51) Int. Cl.
| | |
|---|---|
| *B62D 33/03* | (2006.01) |
| *B62D 33/027* | (2006.01) |
| *H02G 3/22* | (2006.01) |
| *G05G 1/06* | (2006.01) |

(52) U.S. Cl.
CPC ........... *B62D 33/03* (2013.01); *B62D 33/027* (2013.01); *G05G 1/06* (2013.01); *H02G 3/22* (2013.01)

(58) Field of Classification Search
CPC ............ B62D 33/03; G05G 1/06; H02G 3/22
USPC ........................................ 74/502.6; 296/57.1
See application file for complete search history.

(56) References Cited

U.S. PATENT DOCUMENTS

| | | | | |
|---|---|---|---|---|
| 2,572,847 A | * | 10/1951 | Ehret ...................... | E06B 9/58 160/279 |
| 6,126,222 A | * | 10/2000 | Nguyen .................. | E05C 17/36 16/82 |
| 6,126,223 A | * | 10/2000 | Rayburn ................. | B60P 1/438 296/57.1 |
| 7,309,094 B2 | * | 12/2007 | Norfleet .................. | B60P 1/438 296/57.1 |
| 9,637,973 B1 | * | 5/2017 | Berman .................... | E06B 9/58 |

FOREIGN PATENT DOCUMENTS

DE          3103445      *  9/1982

* cited by examiner

*Primary Examiner* — Dennis H Pedder
(74) *Attorney, Agent, or Firm* — King & Schickli, PLLC

(57) ABSTRACT

An apparatus for aiding a user in raising and lowering of a tailgate includes a handle and a connector for connecting the handle to the tailgate to allow for movement of the handle rearwardly relative to the tailgate as the tailgate is initially lowered by the user and forwardly to a position above the tailgate as the lowering of the tailgate is continued. A tailgate lift assembly includes a housing extending along a predetermined length, a spring anchored at one end at a first end of the housing, a connector having a first end affixed to the opposite end of said spring and extending through said housing, and a first fixed guide around which the connector extends. A bumper for covering a corner of a tailgate is also provided.

16 Claims, 20 Drawing Sheets

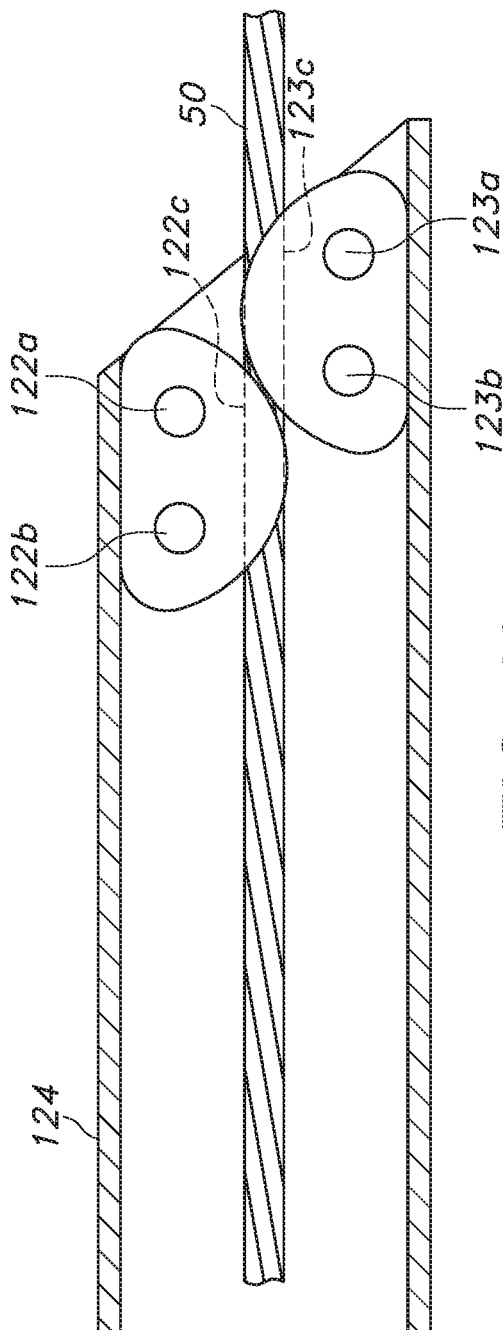
FIG. 10
FIG. 11
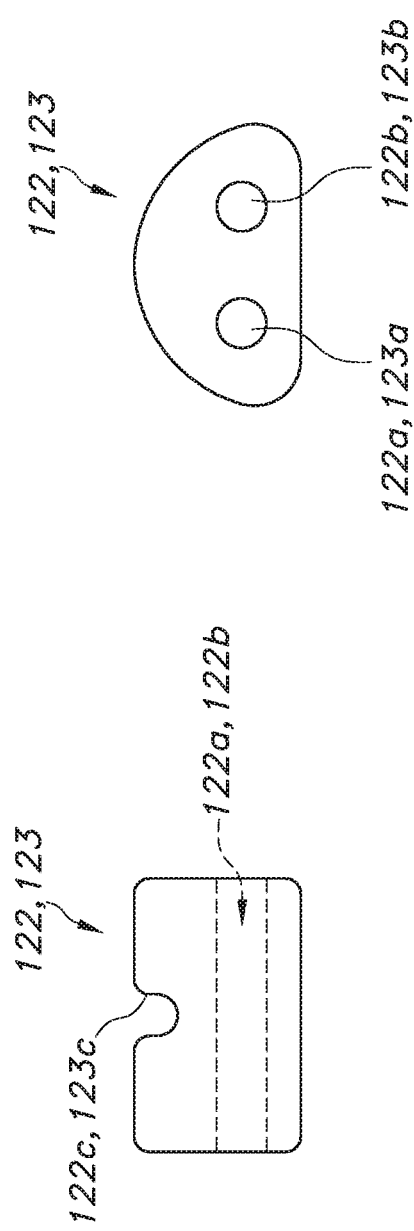
FIG. 12

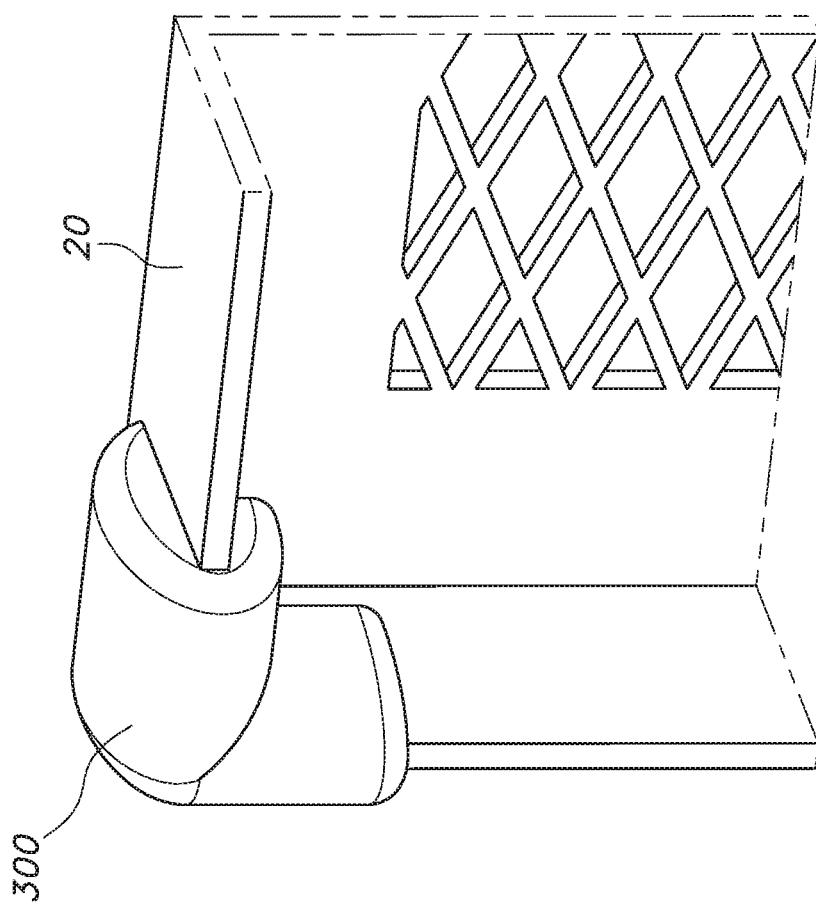

TAILGATE LIFT HANDLE, LIFT ASSEMBLY, AND RELATED APPARATUS

This application is a continuation of U.S. patent application Ser. No. 15/297,530 filed on Oct. 19, 2016 and also claims priority to U.S. Provisional Patent Application Ser. Nos. 62/243,209, 62/280,406, 62/314,107, and 62/400,373, the disclosures of which are incorporated herein by reference.

TECHNICAL FIELD

This disclosure relates to the vehicle arts and, more particularly, to a handle for assisting in raising or lowering a tailgate, a fixed guide arrangement for a tailgate lift-assist device, and safety bumpers for the tailgate.

BACKGROUND

Tailgates are useful in conjunction with vehicles, such as trailers, for multiple purposes. Among these is the ability to prevent cargo from falling off during transportation. In addition, tailgates may be provided with a hinged connection, so that the tailgate in a lowered position may act as a ramp to aid in loading and unloading of cargo, such as tools and/or vehicles.

Due to the stability required by these functions, the tailgate material is normally quite substantial, and may be heavy, thereby presenting a challenge to the user. Specifically, raising and lowering the tailgate may require a user to bend over to the ground and lift the heavy tailgate to pivot the tailgate into a raised position. Similarly, when the tailgate is being pivoted to a lowered position, the user may have to support the weight of the tailgate in a bending position, as the tailgate is positioned on the ground. This range of motion of the body may be undesirable, as supporting significant weight (such as the weight of the tailgate) in a bent position may cause stress on the user's back. Tailgates also often have sharp corners that can cause injuries during the raising and lowering process if not kept in check.

Accordingly, a need is identified for solutions to these and other possible issues relating to the operation of tailgates and similar devices for vehicles.

SUMMARY

According to a first aspect of the disclosure, an apparatus for aiding a user in raising and lowering of a tailgate is provided. The apparatus comprises a handle for raising and lowering the tailgate, and a connector for connecting the handle to the tailgate to allow for movement of the handle rearwardly relative to the tailgate as the tailgate is initially lowered by the user and forwardly to a position above the tailgate as the lowering of the tailgate is continued.

In one embodiment, the handle comprises a grip adapted to engage a hand of the user, and a shaft for extending between the grip and the connector. The connector may include a retainer for constraining rotation of the handle with relative to the tailgate. In one embodiment, the retainer comprises at least one spring, such as a torsion spring or a compression spring. In another embodiment, the retainer comprises at least one bushing for frictionally retaining the handle in a stowed position or a deployed position for raising or lowering the tailgate.

According to a further aspect of the disclosure, a tailgate lift assembly comprises a housing extending along a predetermined length, a spring anchored at one end at a first end of said housing, and a connector having a first end affixed to the opposite end of said spring and extending through said housing. The assembly further includes at least one fixed guide, and the connector extends at least partially around said at least one fixed guide.

In one embodiment, a second fixed guide is also provided. The connector may extend below the first fixed guide and above the second fixed guide. One or more fasteners (such as pairs) may also be provided for connecting each fixed guide to the housing, which ensures that each remains securely held in place against rotation. In one embodiment, the first fixed guide is exposed to an open end of the housing through which the connector passes.

The fixed guide may take various forms. In one example, the fixed guide includes a semi-circular cross-section having a rounded face for engaging the connector, and may have a generally flat rear portion or face for engaging the housing in a stable manner. The fixed guide may comprise a groove for engaging the connector. The fixed guide may also comprise inwardly sloping sides configured to form a center channel to loosely guide the connector. The fixed guide may comprise comprises a solid hourglass shape. The fixed guide may also comprise a first guide configured to keep the connector in an aligned position in relation to the housing, and a second guide configured to allow a deviation from the aligned position.

According to a further aspect of the disclosure, an apparatus is provided including a tailgate for being raising and lowered, the tailgate including a first corner and a first bumper for covering the first corner. The tailgate may include a second corner, and a second bumper may be provided for covering the second corner. The first corner may comprise an upstanding flange and the first bumper may be adapted for receiving the flange. The first bumper may include an L-shaped recess. The first corner may comprise a flat corner, and the first bumper may be adapted for receiving the flat corner. The first bumper may be brightly colored. The first bumper may include a recess for receiving the corner, the recess including an oversized groove for receiving a surface projection of the tailgate. The first bumper may include an angled extension for engaging a portion of the tailgate spaced from the corner.

In the following description, there are shown and described several preferred embodiments of the disclosed inventions. As it should be realized, the arrangements are capable of other, different embodiments and its several details are capable of modification in various, obvious aspects all without departing from the description, as set forth and recited in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the inventions and, together with the description, serve to explain certain principles thereof. In the drawing figures:

FIG. 10 is a side view illustrating one possible arrangement of the fixed guides;

FIGS. 11 and 12 are end and side views of one fixed guide;

Figure 1:
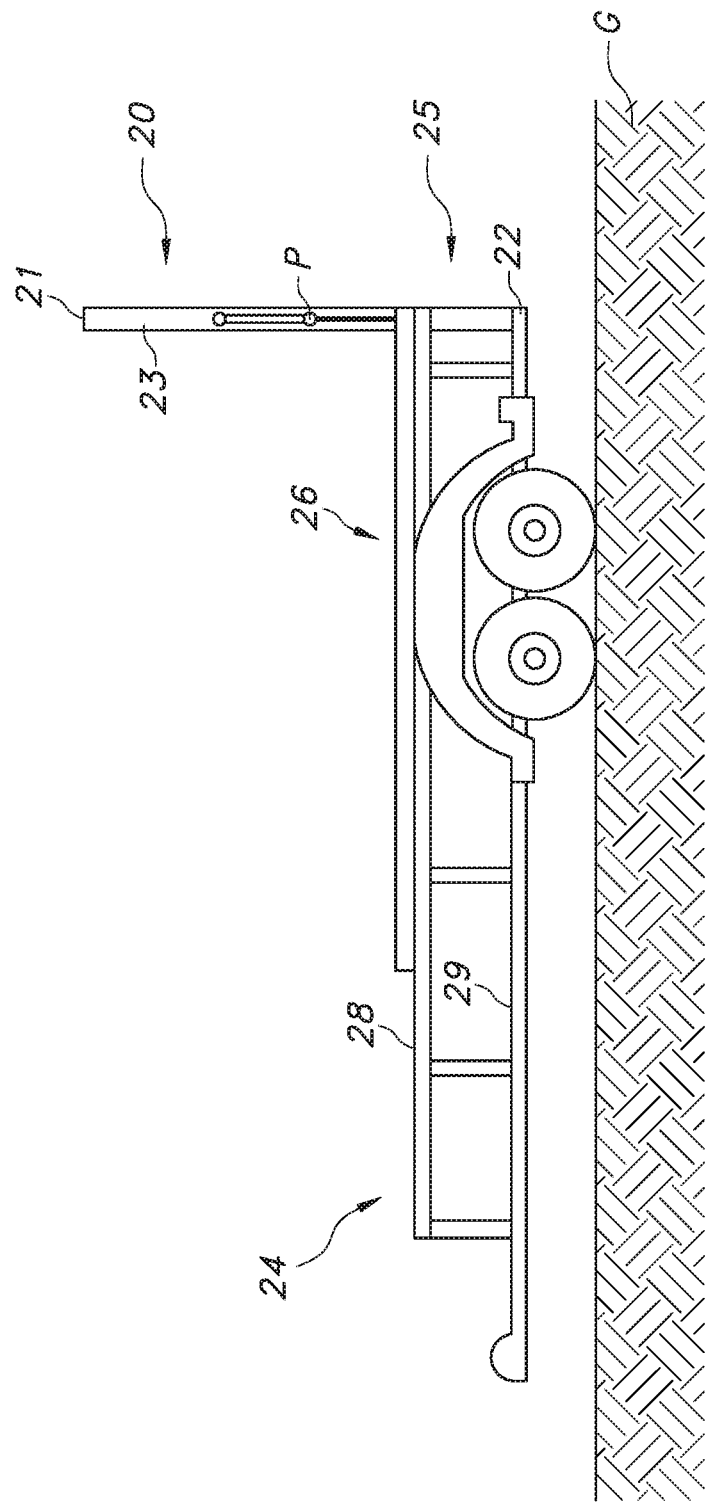
FIG. 1 is a side view of a tailgate connected to a vehicle in the form of a trailer and including a handle in a stowed position.

FIGS. 17A, 17B, 17C, and 17D are side, rear, bottom, and perspective views of a bumper for covering a corner on a tailgate;

FIGS. 18A, 18B, 18C, and 18D are side, rear, bottom, and perspective views of another bumper for covering a corner on a tailgate; and FIGS. 19, 20, 21, and 22 are views of the bumpers in the installed condition on a tailgate.

Reference will now be made in detail to the present preferred embodiments of a tailgate lift assist and related apparatus, examples of which are illustrated in the accompanying drawing figures.

DETAILED DESCRIPTION

Referring now to FIGS. 1-7, one aspect of the disclosure pertains to facilitating the raising and lowering of a tailgate. In this regard, a handle 10 is provided for use in connection with a tailgate 20, which may be associated with a vehicle, such as a trailer 24. In the illustrated embodiment, the handle 10 includes a grip 12 for being gripped such as by the hand of a user, which is connected to a shaft 14 (see FIGS. 5-7).

As illustrated in FIG. 1, the handle 10 may be attached at a point P between a first end 21 and a second end 22 along a lateral side of the tailgate 20, such as along the side rail 23. The first end 21 of the tailgate may be at a point of the tailgate furthest from the trailer 24, and the second end 22 of the tailgate may be at a point adjacent the trailer 24. As illustrated, the second end 22 is attached to the trailer 24 at a rear end 25 of the trailer 24. In the illustrated embodiment, the handle 10 is attached to the tailgate 20 approximately halfway between the first end 21 and the second end 22. The point of attachment between the handle 10 and the tailgate 20 may be at any point that may provide a desirable amount of leverage for raising and lowering the tailgate 20. For instance, in one aspect, the handle 10 may be attached to the tailgate at or near the first end 21 or near the second end 22 (not illustrated), but is preferably intermediate the ends.

Figure 7:
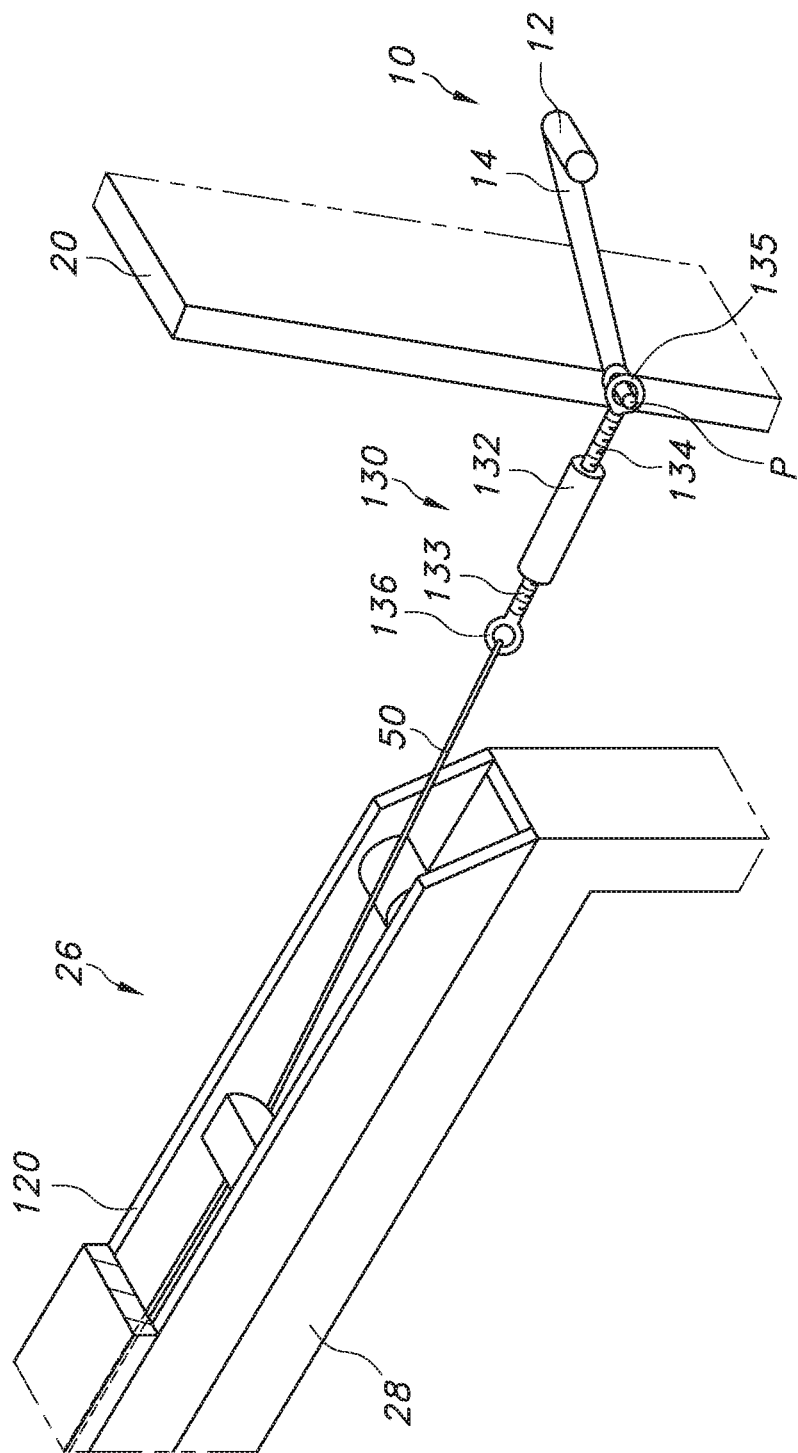
FIG. 7 is a cutaway perspective view illustrating the rearward pivoting of the handle.
Figure 9:
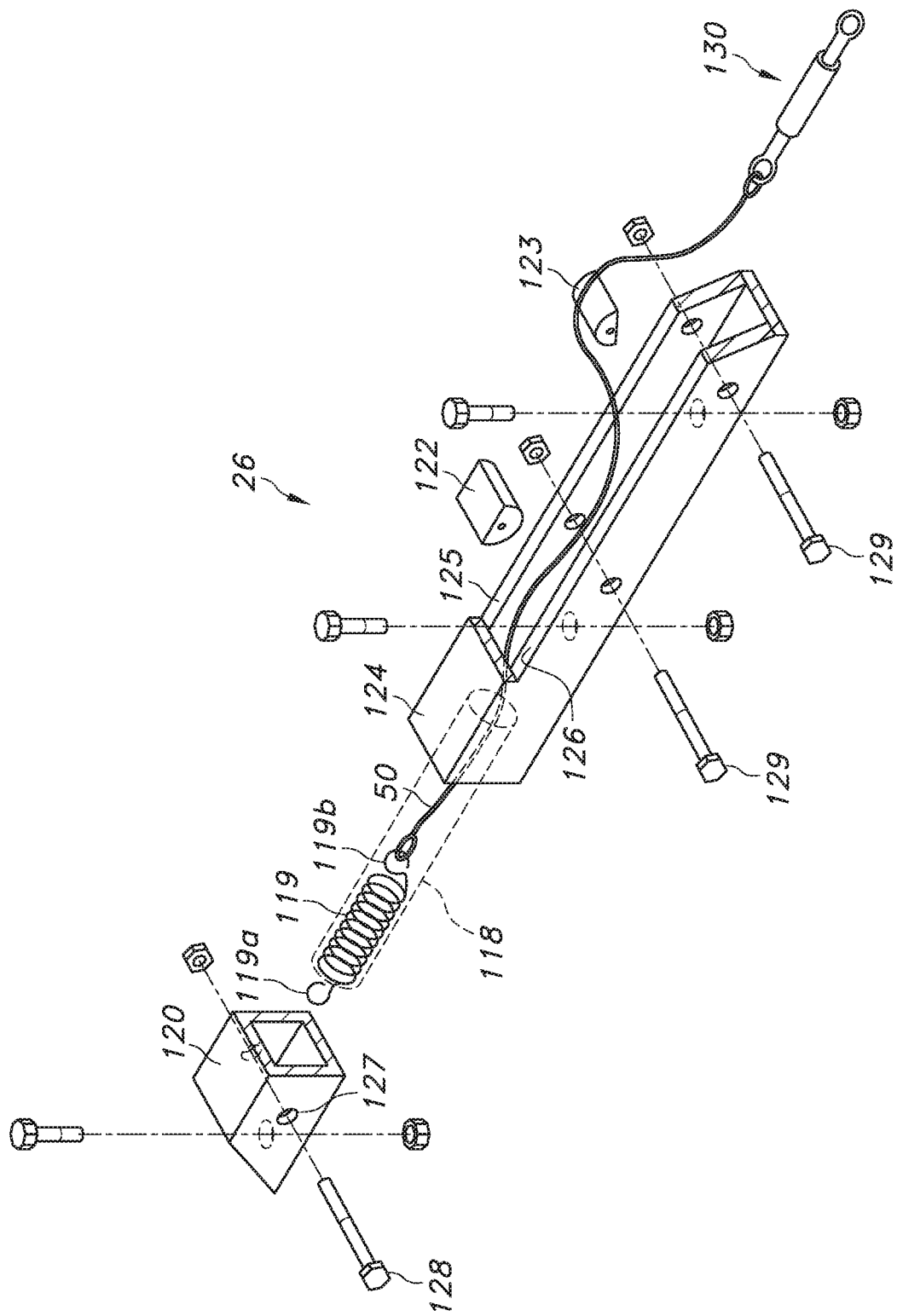
FIG. 9 is a partly cutaway, exploded view of a tailgate lift assist including inserts in the form of fixed guides.

As can be best seen in FIGS. 7 and 9, a tailgate lift assembly 26 may be provided in conjunction with the handle 10. The tailgate lift assembly 26 may be of the sort described in U.S. Pat. Nos. 6,126,223 and 6,550,840, the disclosures of which are incorporated herein by reference. In one aspect, the tailgate lift assembly 26 may be connected to the tailgate 20 via a connector 50, such as a cable, wire, rope, chain, or the like, for assisting in raising and/or lowering the tailgate. The tailgate lift assembly 26 may be associated with one or more rails 28 of the trailer 24. One or both of the tailgate lift assembly 26 and the rails 28 may be positioned above a bed 29 of the trailer 24.

Figure 2:
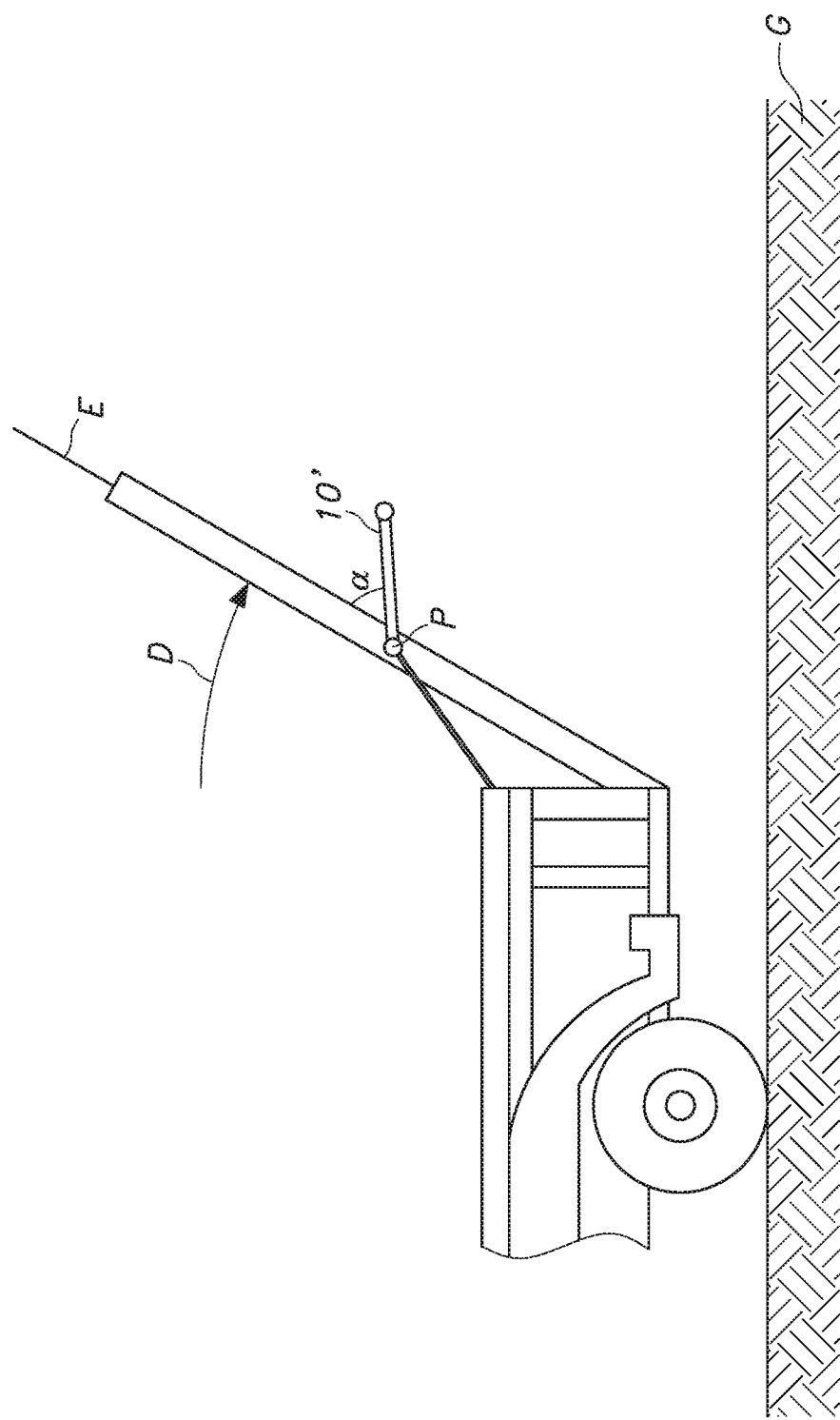
FIGS. 2-4 are action views showing the movement of the handle during the lowering of the tailgate.
Figure 3:
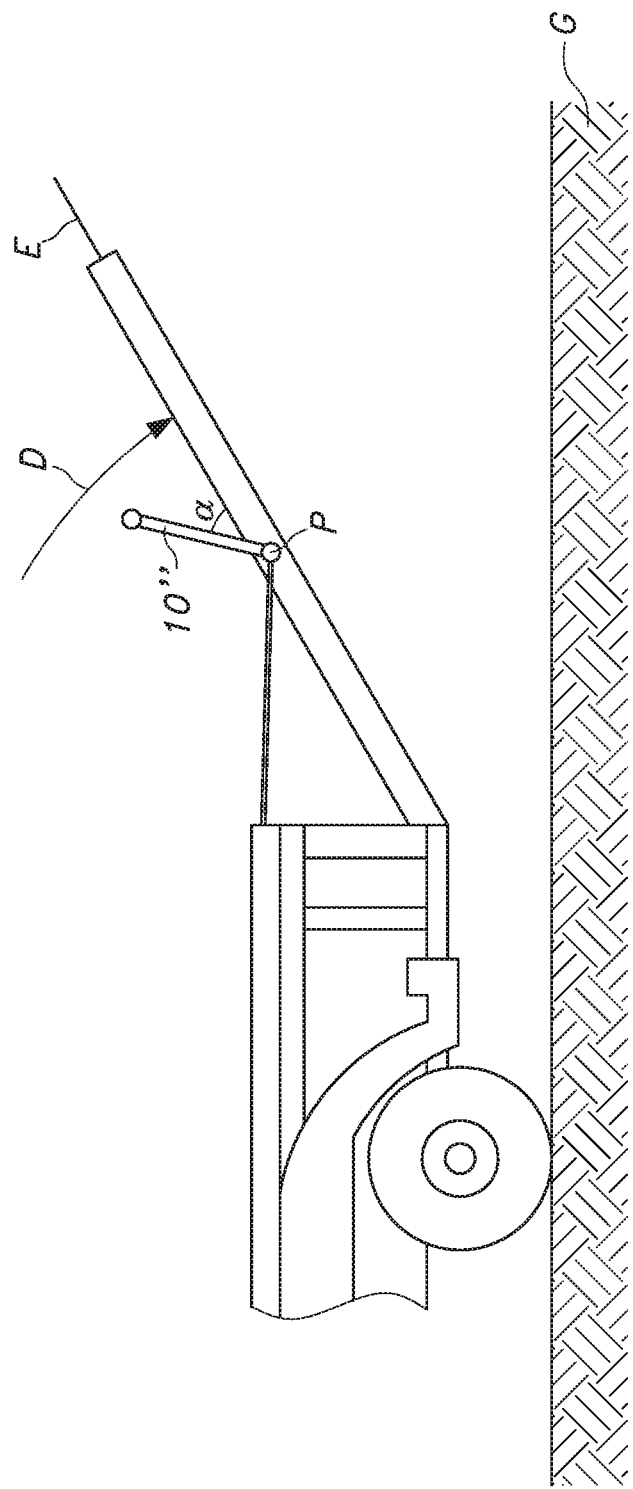
Figure 4:
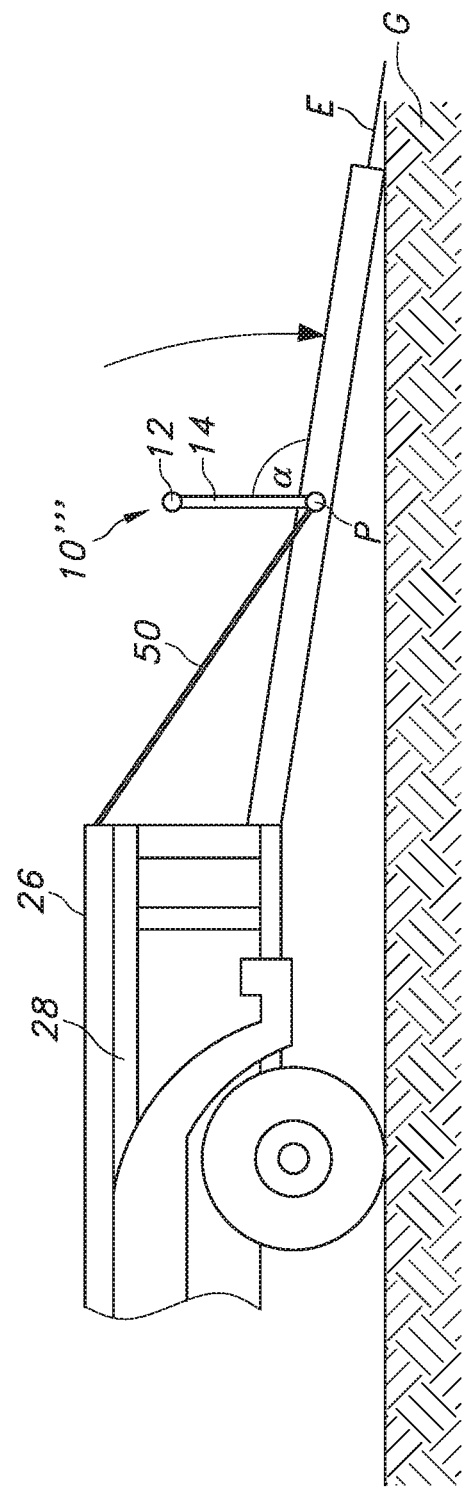

The handle 10 may be pivotally mounted to the tailgate 20, allowing relative rotation therebetween within a full 360 degree range or any portion thereof. With further reference to FIGS. 1-4, the rotation of the handle 10 is illustrated. In FIG. 1, the handle 10 is shown extending vertically in alignment with and parallel to the tailgate 20 in the upright or raised position. In FIG. 2, the handle 10 is used to begin to lower the tailgate 20 to the ground, with the handle moved (rotated) rearwardly to facilitate the downward movement (note arrow D and handle position 10″ behind and below the plane E of the tailgate, thus forming a negative angle $\alpha$). As the movement continues, the handle 10 may rotate forwardly to a more vertical position (10″) and forming an acute angle $\alpha$ as the tailgate 20 continues the movement toward the ground (FIG. 3), at which point the handle 10 is actually above the plane E of the tailgate. Once fully lowered, as shown in FIG. 4, the handle 10 may extend essentially perpendicular to the ground G (position 10‴) and the plane E (such that angle $\alpha$ is right or obtuse). Raising the tailgate 20 simply involves reversing the operation, such as by pulling up on the handle 10, then moving it rearwardly, and then forward and ultimately to the aligned position for storage, as shown in FIG. 1.

The shaft 14 may be sized so that the grip 12 is at or just below the user's waist when the handle 10 is in a vertical position, as shown in FIG. 4. When the handle 10 is in this position, the grip 12 may be even with the rail 28 and/or the lift assembly 26. This may allow a user to grasp the handle 10 to raise and/or lower the tailgate 20 without bending over at all, or without having to bend down to the level of the lowered tailgate 20.

Figure 5:
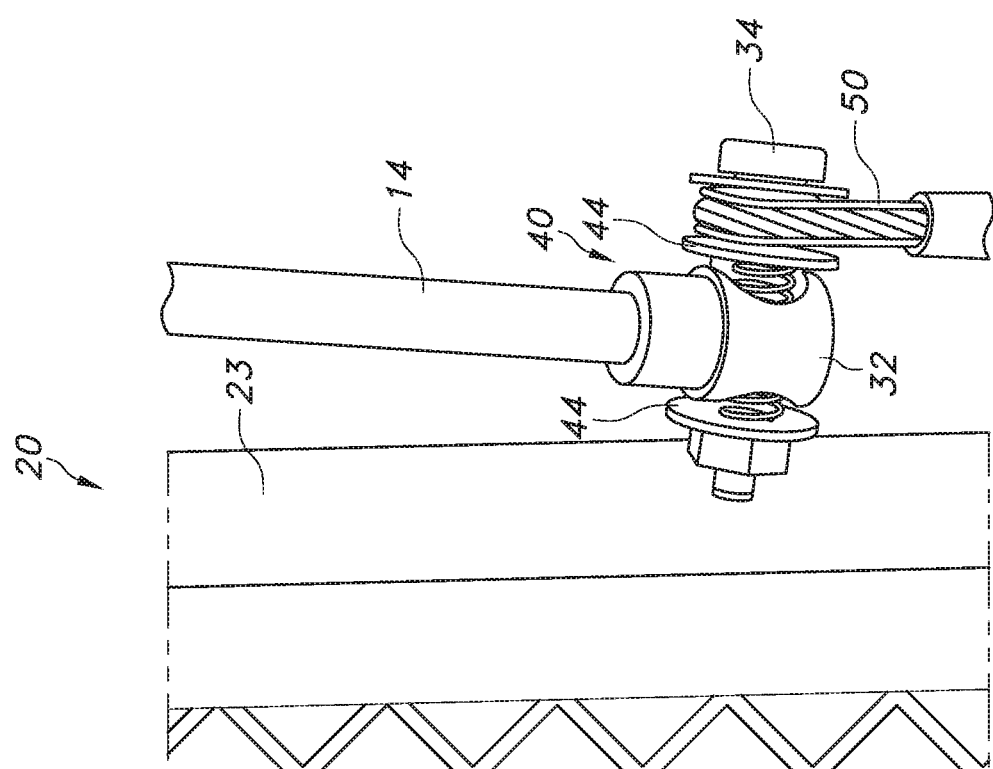
FIG. 5 is an enlarged view of one end of the handle showing the manner of connection to the tailgate to allow for the selectively constrained movement.
Figure 6:
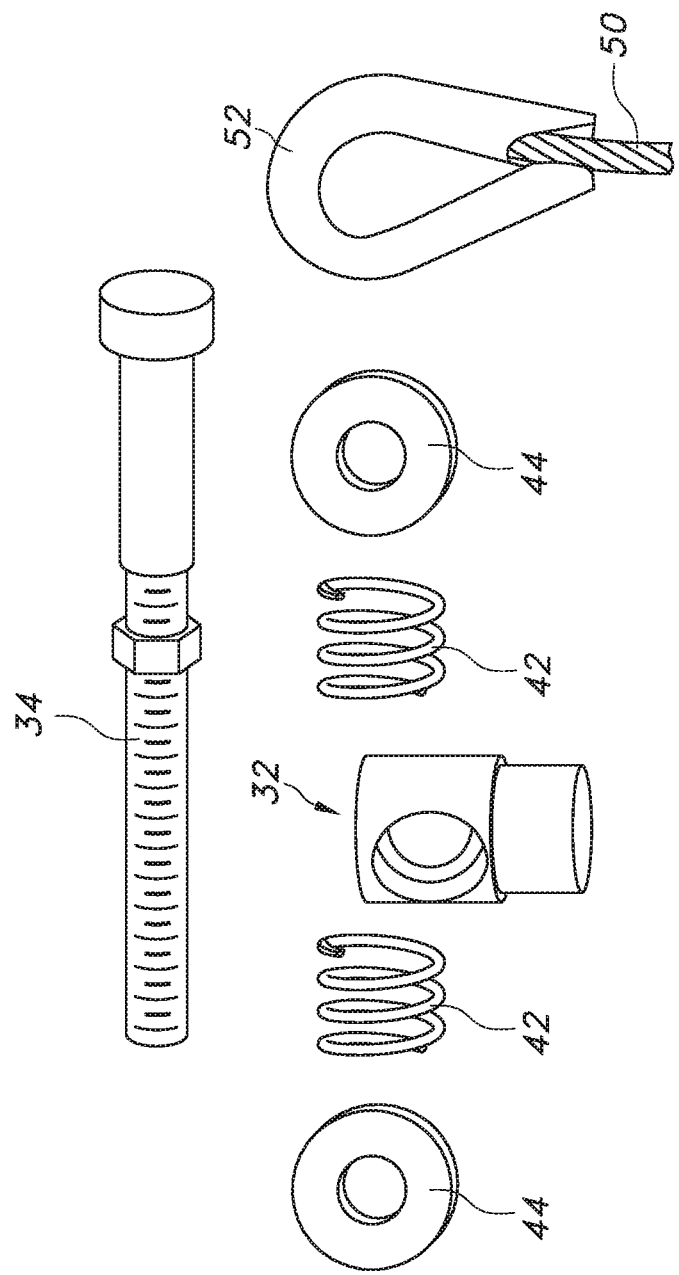
FIG. 6 is an exploded view of the connection arrangement.

With reference to FIG. 5, a connector 30 may be provided for connecting the handle 10 to the tailgate 20. The connector 30 may comprise a receiver 32 and a fastener 34 for engaging the receiver to connect the handle 10 to the side of the tailgate 20 in a manner that allows for the desired pivoting movement. As illustrated, the receiver 32 comprises an aperture extending through a lower portion of the shaft 14 and the fastener 34 comprises a bolt, which extends through the aperture and connects to the tailgate 20.

With further reference to FIG. 7, the connector 30 may include a retainer 40 for retaining the handle 10 in a fixed position relative to the tailgate 20. The retainer 40 may be adapted to allow for controlled rotational movement of the handle 10 with respect to the tailgate 20. For example, the retainer 40 may be adapted to allow for rotational movement of the handle 10 upon exertion of a force on the handle by the user, but retain the handle 10 in a fixed position absent the application of an external force from the user.

As illustrated, the retainer 40 may comprise one or more springs 42. The spring(s) 42 may comprise compression springs adapted to exert pressure on the handle 10, thereby holding the handle 10 in a fixed position. In the event that the user exerts a rotational force on the handle 10, the spring 42 may allow rotation of the handle 10. Upon the user ceasing to exert said rotational force, the springs 42 may act to retain the handle 10 in position. Other types of springs, such as torsion springs, may also be used for this purpose.

The retainer 40 may include one or more spacers 44, which may be in the form of washers. The spacer(s) 44 may engage the fastener 34. As illustrated, the spacers 44 may provide a first surface against which the spring 42 may abut at one end. The other end of the torsion spring 42 may abut the handle 10. Friction between the spring 42 and the handle 10 may retain the handle in a given position. In one aspect, the spring(s) 42 may engage the handle at the receiver 32, which may be adapted to receive a portion of the spring 42. The inner surface of the aperture may provide a surface against which the friction provided by the spring 42 may act.

Figure 8:
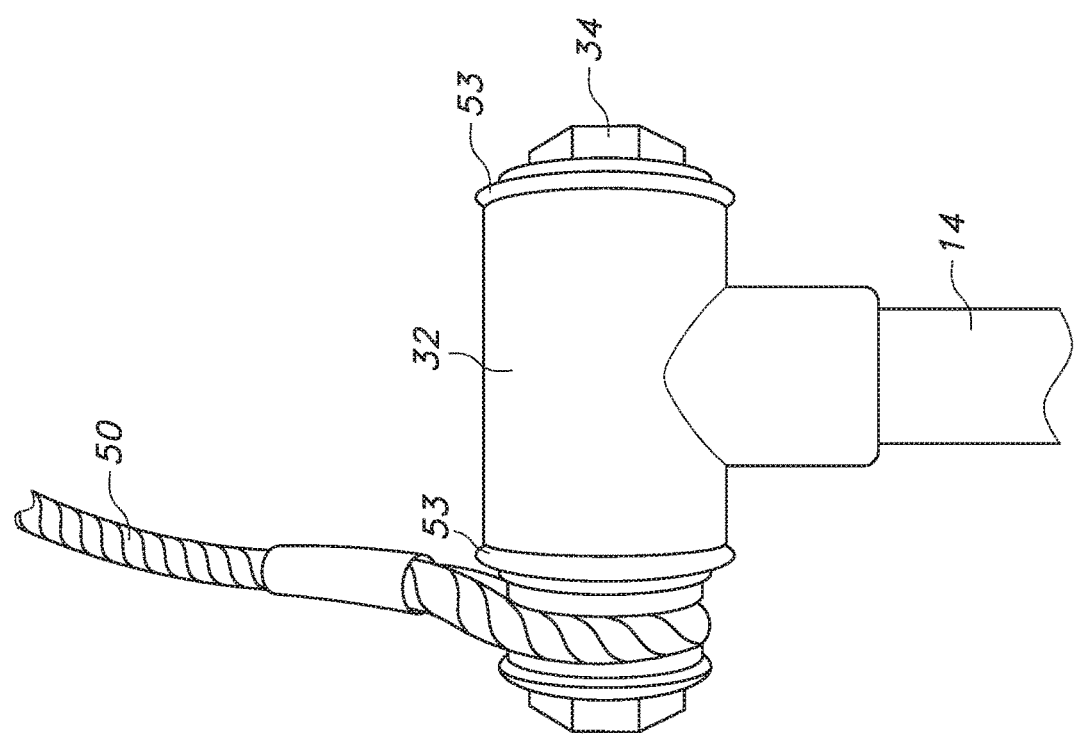
FIG. 8 is an enlarged, partially cutaway view showing another manner of connection of the handle to the tailgate to allow for the selectively constrained movement.

As can perhaps best be seen in FIG. 8, retainer 40 may include bushings 53 in lieu of springs. As a result of the compressive force provided by fastener 34, the bushings 53 may provide for frictional engagement between the handle 10 and the washers 44. Thus, the relative mobility of the handle 10 can be adjusted by tightening or loosening the fastener 34. The bushings 53 may comprise metal, plastic or any other suitable material for creating the desired friction to restrain movement of the handle 10, yet allowing for the desired pivoting movement when grasped and used to raise and lower the tailgate 20.

The retainer 40 may also comprise a ratchet for allowing controlled rotation of the handle 10. For example, the ratchet may comprise a wheel with teeth for engaging a pawl. In another aspect, the retainer 40 may comprise a locking hinge, which may allow the user to manually lock and release the handle 10 in rotational position with respect to the tailgate.

In a further aspect, the connector 30 may be adapted to engage the connector 50 for connecting the handle 10 to the tailgate lift assembly 22. In one aspect, the connector 50 may include a coupler 52, such as a wire thimble. The holder 46 may be adapted to retain the connector 50 and/or the coupler 52 with respect to the connector 30. In other embodiments, the holder 46 may comprise a groove, a receiver, one or more extensions, or any other device capable of retaining the cable and/or coupler 52 with respect to the connector 30.

The holder 46 may be adapted to rotatably couple the connector 50 and/or coupler 52 to the connector 30. For example, the holder 46 may allow for rotation of the connector 50 and/or the coupler 52 with respect to the connector 30 or fastener 34. This may allow for the connector 30 to raise and lower with the tailgate 20 without the risk of tangling the connector 50.

With reference to FIGS. 7 and 9-15, a further aspect of the disclosure pertains to providing a lift assembly 26 for guiding a connector 50 in connection with a lifting apparatus for use in lifting a tailgate 20 or the like, which may be associated with a trailer 24. As is shown in FIG. 9, the lift assembly 26 comprises a housing 120, which retains therein several elements of the lift assembly. Extending rearwardly is connector 50, which securely attaches the tailgate 20 to the trailer side rail 28. The connector 50 may be a stainless steel cable capable of withstanding high pound force, such as a two-thousand-pound steel cable, but as noted may take other forms as well.

Connector 50 extends rearwardly from the housing 120 to the tailgate 20. In combination with FIG. 10, FIG. 11 additionally discloses the makeup of the secure attachment of the connector 50 to the housing 120. In reference to both FIGS. 7 and 9, a turnbuckle 130 is utilized at the rearward most end of connector 50 directly adjacent to tailgate 20. Turnbuckle 130 is comprised of a cylindrical collar 132 which has threaded openings on either end. Inserted into each threaded opening are first pin 133 and second pin 134. First pin 133 is designed such that eyelet 136 extends rearwardly for attachment to connector 50 and has on its opposite end a threaded portion which is threadably received into collar 132. Additionally, extending from the other side of collar 132 is second pin 134 which has eyelet 135 extending rearwardly therefrom and a treaded neck portion which extends internally into collar 132. Utilization of turnbuckle 130 allows the user to adjust the length and tension of connector 50 as well as the amount of eventual force required for raising and lowering the tailgate 20.

The amount of force required in the biasing of connector 50 may be significant in that the tailgate 20 found on many typical trailers can be exceptionally heavy. It is not uncommon to find a tailgate 20 weighing in excess of two hundred pounds. Thus, the connector 50 must be biased and tension in such a way so that the user may, with relative ease, raise and lower the heavy tailgate 20. Adjustment of the tension, the origin of which will be described herein, may thus be accomplished through utilization of turnbuckle 130 and collar 132.

Turning back to the lift assembly 26, it may be seen that the connector 50 is biased by spring 119. The spring 119 can be a standard steel spring capable of providing about 150 pounds of force. As shown in FIG. 9, the spring 119 is retained within housing 120 by anchoring bolt 128, which extends through an attachment eyelet 119a or other standard affixing mechanism utilized for high tension springs.

At the opposite end of spring 119 is securely affixed the forward end of connector 50 through spring attachment eyelet 119b. The connector 50 is attached such that spring 119, securely anchored to housing 120, biases the tension on connector 50 such that rearward axial movement of the connector 50 causes high tension to appear thereon, biasing the spring to return to its untensioned position. Thus, the connector 50 will have significant tension biasing the cable in the forward position such that the tailgate 20 to which it is attached will want to raise. However, such tensioning may be adjusted so that the tailgate 20 will only raise upon upward force applied thereto. Such adjustment to the tensioning is provided through turnbuckle 130 previously disclosed herein. The adjustments provided may be finely tuned such that a minimal amount of upward force need be provided before the tailgate begins its upward movement. Thus, tensioning may be fine-tuned to a point where only 5 to 10 pounds of force may be required to raise the relatively heavy tailgate 20 which is hingedly attached to trailer bed 29 through hinge (not shown).

In order to provide for the smooth travel of connector 50, fixed guides 122, 123 may be provided. These guides 122, 123 provide a guiding mechanism by which the connector 50 may move axially within the housing 120 and rearward therefrom with relative ease. Guides 122 and 123 are securely affixed between lift assembly sidewall 126 and sidewall 125. First guide 122 is affixed to sidewalls 125 and 126, and second guide 123 is affixed to sidewall 125 and 126. Specifically, the guides 122, 123 may also be adapted for engaging a pair of fasteners. For this reason, each guide may be provided with one or pair of openings 122a, 122b; 123a, 123b, which receive one or more fasteners (such as bolts 129 for engaging corresponding nuts on the opposite side of the housing 120) and thus connect the guides 122, 123 to housing 120 and hold them against rotation as the connector 50 traverses during raising and lowering of the tailgate 20. The use of moving parts is thus avoided in this embodiment, which may prolong the service life of the assembly 26 and also allow for robust performance under harsh operating conditions.

As can be seen in FIG. 9, the top wall 124 of assembly housing 120 is shortened and removed from a point just before the placement of first guide 122. Top wall 124 of housing 120 does not extend completely to the rearward portion of housing 120 since connector 50 may extend upwardly outside of the area of containment of housing 120. Thus, when the tailgate 20 is in the fully raised position, connector 50 will extend upward at an angle from first guide 122 to a point in contact with tailgate 20.

In either case, connector 50 may extend underneath or below first guide 122 and above second guide 123. As the tailgate 20 is lowered from its raised position, guide 122 may allow the connector 50 to move rearwardly thereunder through rotational movement and due to the tensions caused by the spring 119. At some point during lowering of the tailgate 20, connector 50 may come into contact with second guide 123 which will additionally aid in lowering the tailgate 20 by placing downward force on second guide 123 once in contact with connector 50. As the tailgate 20 is further lowered, both first guide 122 and second guide 123 aid in the rearward movement of connector 50. Once in the fully lowered position, connector 50 will extend again below guide 122, above guide 123, and downward therefrom at an angle determined by the position of connection of connector 50 on the trailer tailgate side rail 23.

Returning to FIG. 9, it may be seen that spring 119 may be retained completely within housing 120 providing an additional safety factor therein. Further, spring 119 may be surrounded by plastic tubing or sleeve 118, which extends rearward from the spring toward the tailgate 20 a distance which covers the amount of extension of the spring 119 when the tailgate 20 is placed in the lowered position. Plastic tubing 118 may surround spring 119 such that as the spring is tensioned by lowering of tailgate 20, the high tension spring will not come into contact with the interior of housing 120 and cause frictional noises or other undesirable characteristics. Tubing 118 additionally protects the spring 119 and retains it appropriately within housing 120. The spring 119 may extend approximately 18 inches in length and may, upon full tensioning of lowering of the tailgate 20 extend rearward approximately double that original untensioned length.

As is additionally shown in FIG. 9, the housing 120 is provided with means for attachment to the top portion of trailer side rail 28. A plurality of apertures are found on the bottom portion of housing 120 such that it may be securely affixed to the trailer side rail 28. Standard bolts may be applied thereto or the housing 120 may be affixed utilizing welding or other commonly known techniques. As has also been previously disclosed, the lift assembly 26 may be fully integrated within the top portion of trailer side rail 28 such that it is integral therewith.

Turning now to FIGS. 10-12, one embodiment of the guides 122, 123 is shown. The guides 122, 123 are shown positioned in the open end of housing 120, and are staggered along its longitudinal axis, but are more closely spaced than shown in FIG. 9. The relative spacing may be adjusted depending on the particular arrangement.

Each guide 122, 123 may comprise a structure having a generally semi-circular cross-section with a rounded engagement surface for engaging the connector 50. Specifically, as discussed above, the first or rearward guide 122 may engage the connector 50 and guide it as the tailgate 20 is raised, and the second or forward guide 123 may engage it when it is lowered. Even more specifically, the connector 50 may partially wrap around the face of each guide 122, 123 as the tailgate 20 is raised and lowered, with the guides 122, 123 providing smooth, sliding engagement, preferably with low frictional engagement, and without any moving parts to provide the guidance.

As shown in FIG. 10, and perhaps best understood with reference to FIG. 11, each guide 122, 123 may be provided with a groove 122c, 123c. The grooves 122c, 123c may be arranged to at least partially receive and engage the connector 50. The width of each groove 122c, 123c may be slightly greater than the diameter of the connector 50, and the depth may be such that the entire connector 50 received therein (see FIG. 10).

Figure 13:
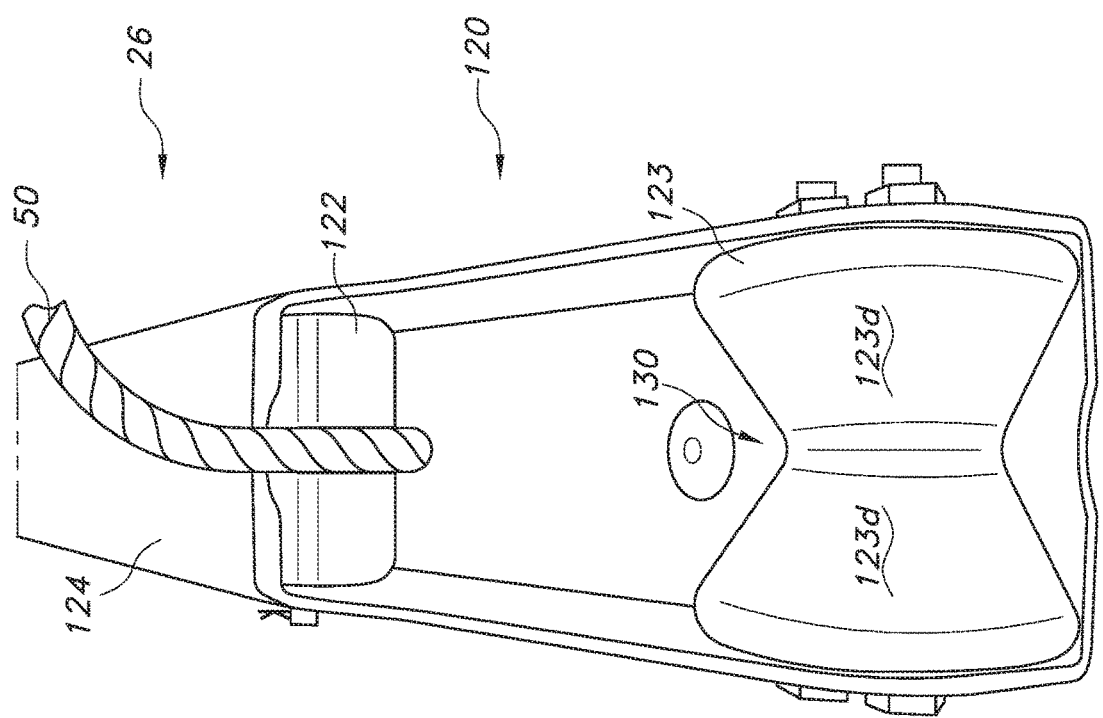
FIGS. 13 and 14 are front and perspective views of a different embodiment of the fixed guide.
Figure 14:
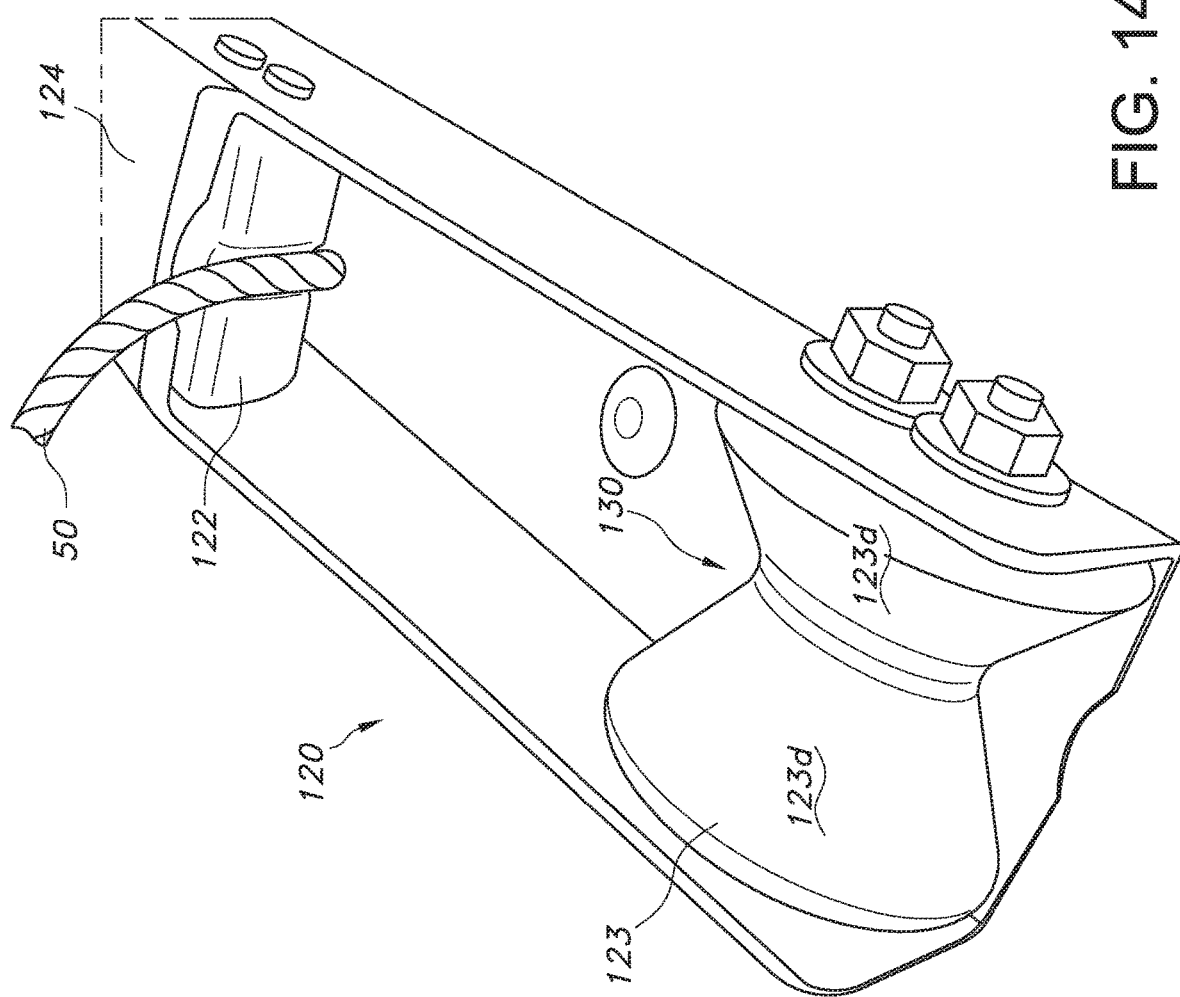

Turning now to FIGS. 13 and 14, another embodiment of a lift assembly 26 with fixed guides 122, 123 is shown. In this embodiment, guides 122 and 123 are shown spaced apart in the open end of housing 120, with guide 123 being positioned near the end of housing 120. First or distal guide 122 may be identical to the guides discussed above and illustrated in FIGS. 10-12. The second or proximal guide 123 may comprise a solid structure (except for any passages for receiving fasteners) having a generally hourglass profile (the specific details of the shape may vary in height, width, slope, etc.), with a concave upper surface 123d for engaging connector 50, and the opposite and side faces being generally planar or flat. This concave surface 123d of the second or forward guide 123 is configured to loosely engage the connector 50. While the connector 50 may partially wrap around the curved face of the guide 122, guide 123 is configured to engage the connector 50 at the central channel 130 of the concave surface. Ideally, the connector 50 remains engaged at the central channel 130. However, the concave shape is configured to allow the connector 50 to move away from the central channel 130, while still generally engaging the connector 50. This reduces the wear and stress on both the connector 50 as well as on guide 123, prolonging the usable life of both.

Figure 15:
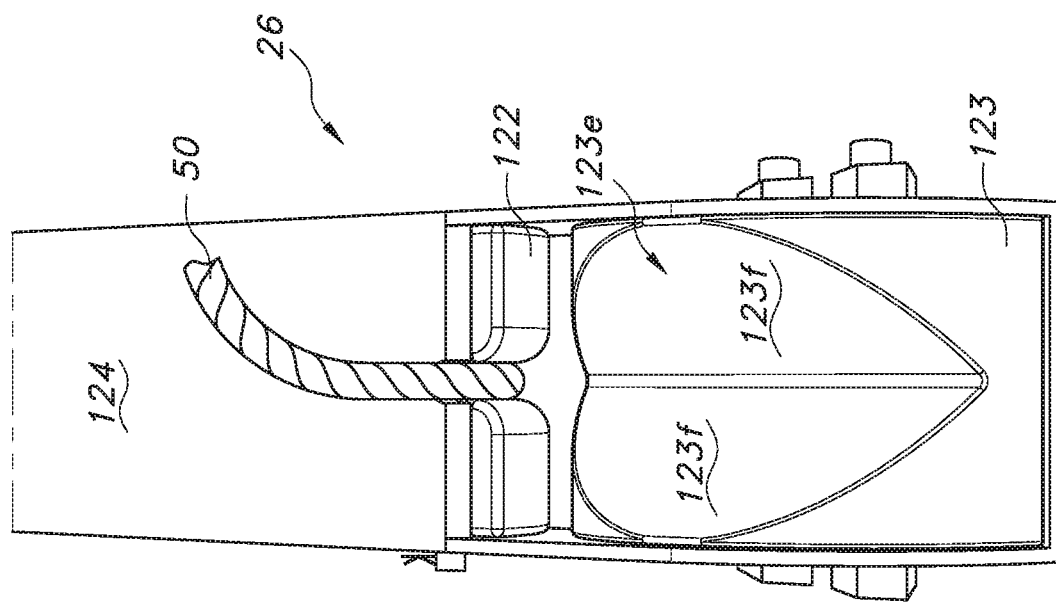
FIGS. 15 and 16 are front and perspective views of a further embodiment of the fixed guide.
Figure 16:
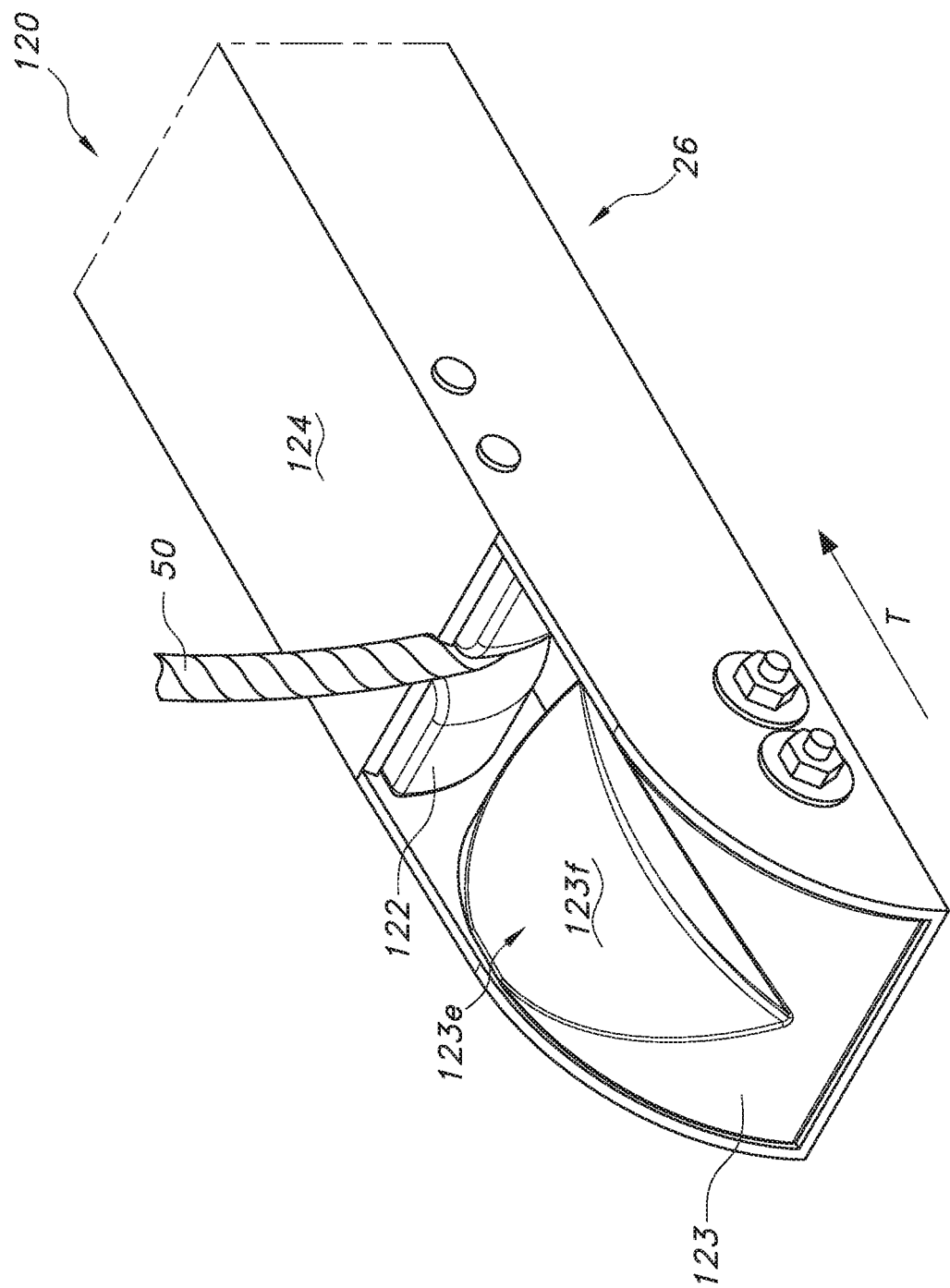
Figure 17B:
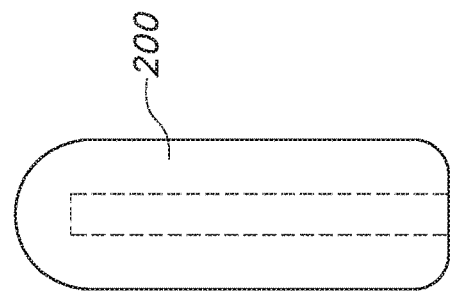
Figure 17D:
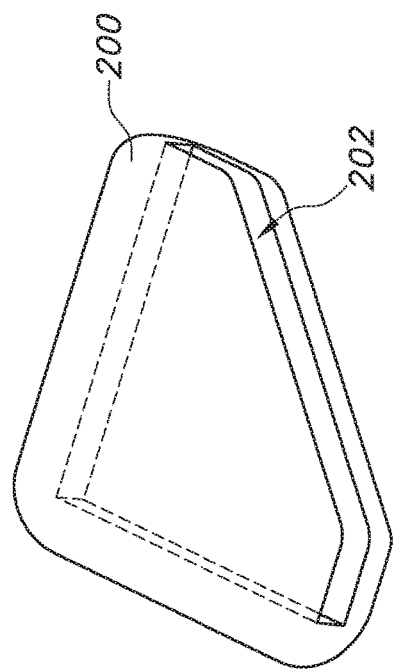
Figure 17A:
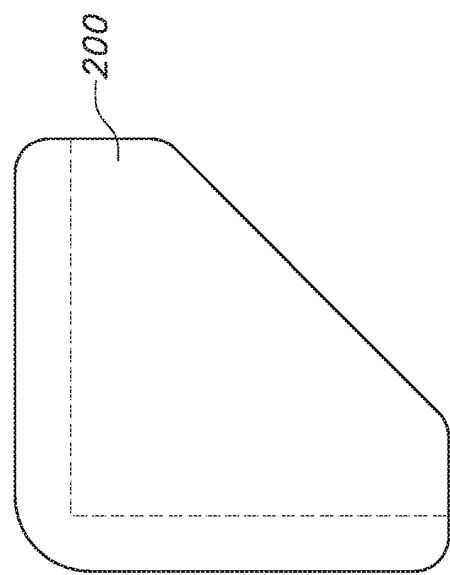
Figure 17C:
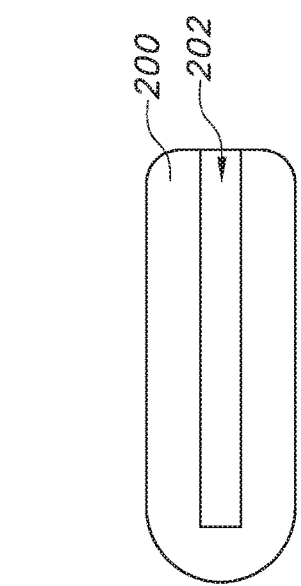
Figure 18B:
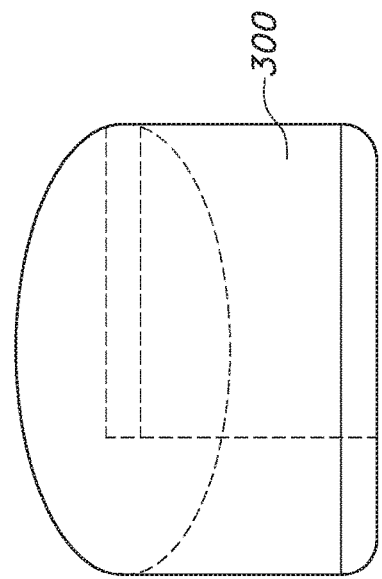
Figure 18D:
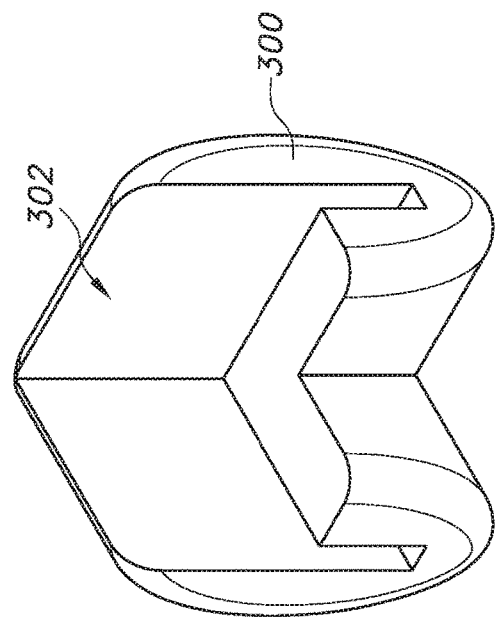
Figure 18A:
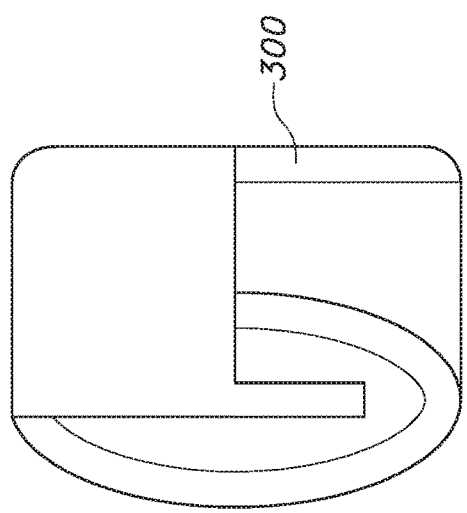
Figure 18C:
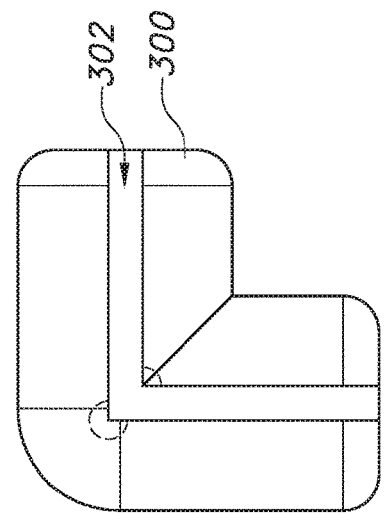
Figure 20:
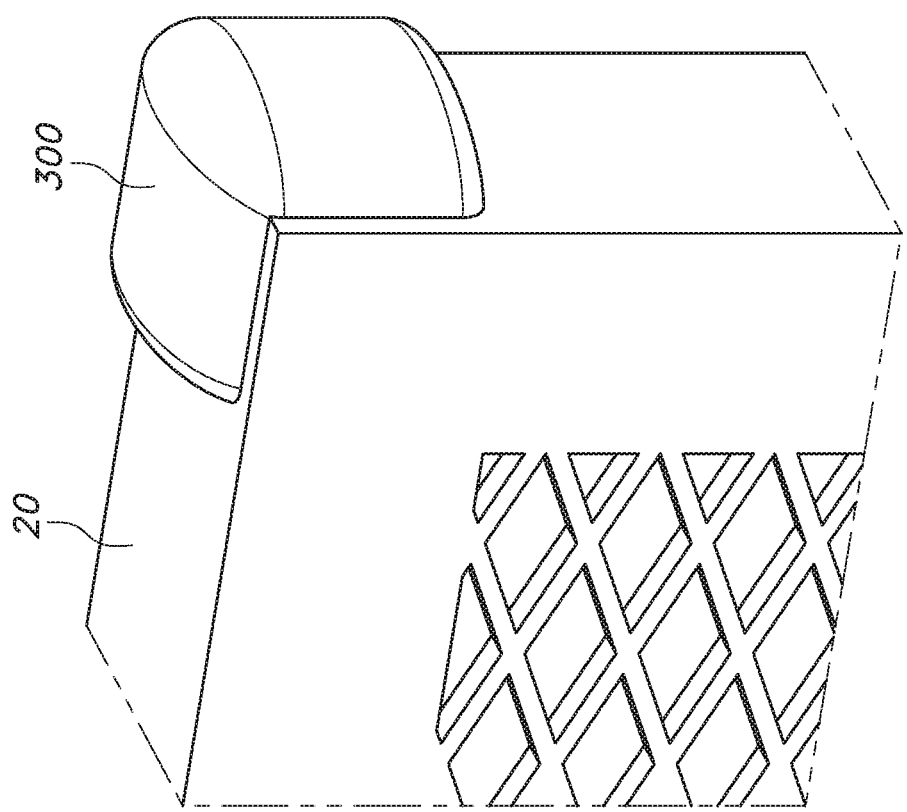
Figure 21:
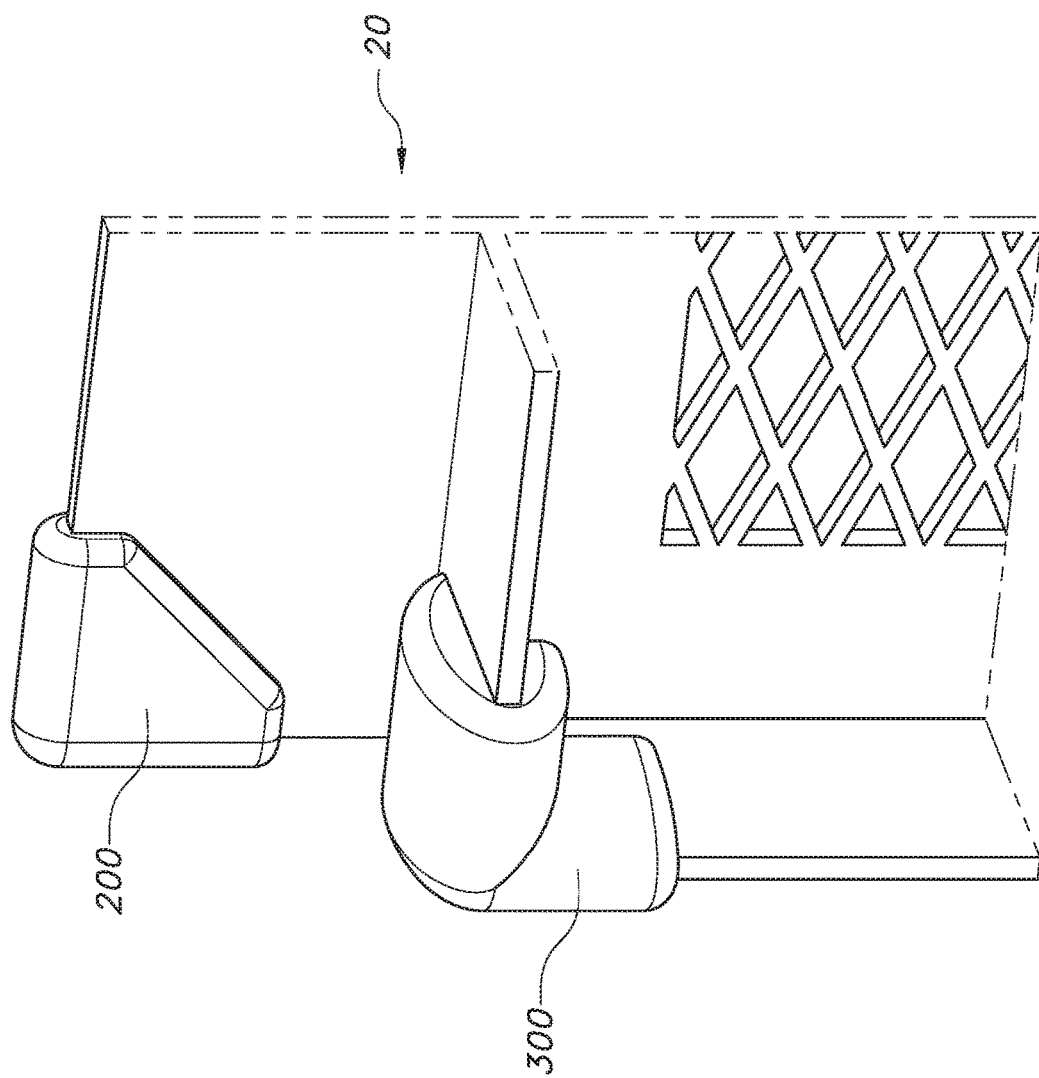

Still a further embodiment of a lift assembly 26 is shown in FIGS. 15 and 16. In this embodiment, the distal guide 122 may be the same as described above. The proximal guide 123 as illustrated includes a groove comprising synclinal walls. Specifically, FIGS. 15 and 16 illustrate that proximal guide 123 has a wedge-shaped cut out 123e with sloping side faces 123f. The connector 50 may thus move within the cut out 123e when the tailgate 20 is lowered, and may also move laterally (and vertically) to accommodate side-to-side movement without restriction, while the desired guiding function may still be provided. Indeed, the sloped surfaces tend to guide the connector 50 to a centered position during a lowering operation, and thus ensure that the desired low friction engagement is established (but importantly for purposes of this particular embodiment, without the need for rotatable structures, such as rollers). While it desirable for the side faces 123f to taper in the direction of vehicle travel T to accommodate side-to-side movement of the connector 50, the particular shape is not considered important from a functional standpoint.

The guides 122, 123 may be made of a plastic material, such as nylon, and preferably a self-lubricating material, such as a self-lubricating nylon material. However, any suitable material, including ceramics or metal, may be utilized. The desire would be to provide a low coefficient of sliding friction between the guides 122, 123 and the connector 50.

A further aspect of the disclosure relates to the provision of a covering or bumper for protecting users from the relatively sharp corners of the tailgate 20. FIGS. 17A-17D show one embodiment of a bumper 200 for use on a first type of generally flat corner (see FIG. 21), and FIGS. 18A-18D illustrate another embodiment of a bumper 300. In each embodiment, the cover 200, 300 includes a receiver 202, 302 for receiving a portion of the tailgate 20 (an L-shaped corner for bumper 300, such that receiver 302 is L-shaped (see FIG. 18C), or a flat corner for bumper 200, as indicated in FIG. 19).

The bumpers 200, 300 may be made of a relatively flexible material, such as a polymer, and thus protect against damage as a result of the sharp corners of the tailgate 20 when it is raised or lowered. The bumpers 200, 300 may also be made of relatively bright colors (white, yellow, orange) so that the corners of the tailgate are noticed. The bumpers 200, 300 and, in particular, the receivers 202, 302 may also be provided with internal recesses or grooves (see dashed line representation in FIG. 18C) to accommodate any surface protrusions on the corners, such as those created by welds.

Figure 22:
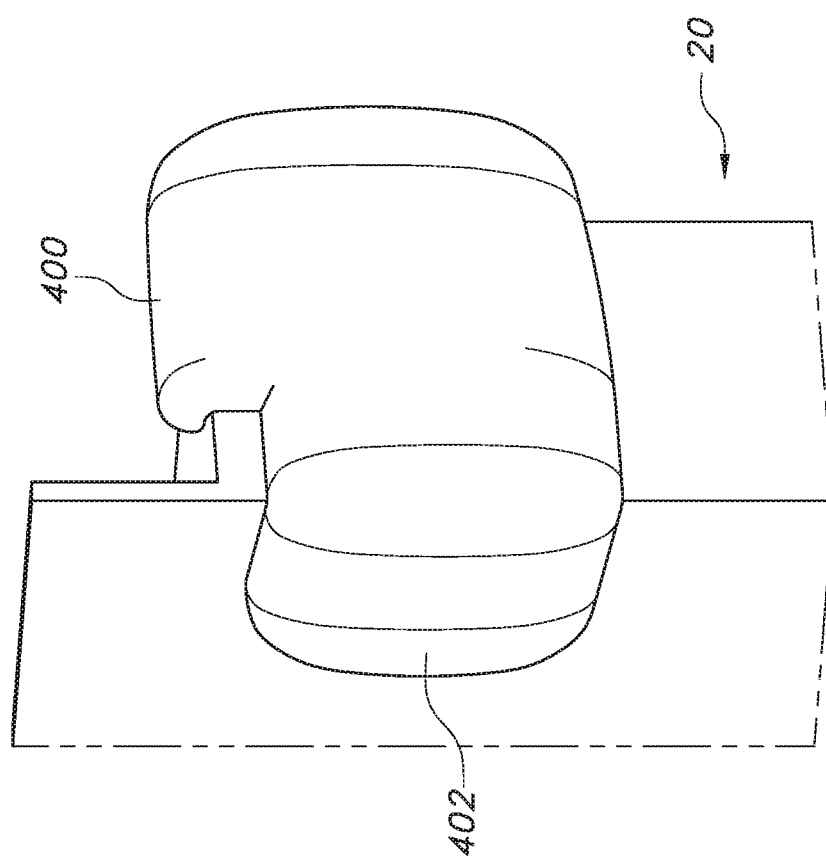

FIG. 22 further illustrates that a bumper 400 (which may be similar to bumper 300 in basic construction) may further include a portion forming an extension 402 that serves as a retainer for retaining the bumper on the tailgate in a secure, but removable manner. The extension 402 may depend from the body of the bumper 402, and may be biased or angled (from greater than zero to ninety degrees) to provide a gripping force for retaining the bumper in position covering the corner. The engagement may be with a rear surface of the tailgate, which would not be one of the surfaces forming the corner that is being covered. To release the gripping force, the extension 402 may simply be lifted out of contact with the tailgate, and the bumper 400 may slide off of corner and become fully released.

The foregoing descriptions of various embodiments provide illustration of the inventive concepts. The descriptions are not intended to be exhaustive or to limit the disclosed invention to the precise form disclosed. Modifications or variations are also possible in light of the above teachings. For instance, instead of or in addition to mechanical fasteners, the guides 122, 123 serving as the fixed inserts may be fixed in place, such as by using adhesives, welding, or like bonding techniques. Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, shapes, materials, or combinations thereof. Any species element of a genus element can have the characteristics or elements of any other species element of that genus. The term "comprising" is not meant to be limiting. The above-described configurations, elements or complete assemblies and methods and their elements for carrying out the invention, and variations of aspects of the invention can be combined and modified with each other in any combination.

What is claimed is:

1. A tailgate lift assembly, comprising:
an elongated housing;
a spring anchored at one end at a first end of the housing;
a connector having a first end affixed to the opposite end of said spring and extending through said housing; and
first and second stationary guides at least partially within the housing, the first stationary guide including a first groove facing a first direction for engaging the connector, and the second stationary guide including a second groove comprising a wedge-shaped cut out facing a second direction, opposite the first direction, for engaging the connector.

2. The assembly of claim 1, wherein the connector extends below the first stationary guide and above the second stationary guide.

3. The assembly of claim 1, further including a pair of fasteners for connecting each stationary guide to the housing.

4. The assembly of claim 1, wherein the first stationary guide is exposed to an open end of the housing through which the connector passes.

5. The assembly of claim 1, wherein the first second stationary guide comprises inwardly sloping sides, the inwardly sloping sides configured to form a center channel to loosely guide the connector.

6. The assembly of claim 1, wherein the first stationary guide is configured to keep the connector in an aligned position in relation to the housing, and the second stationary guide is configured to allow a deviation from the aligned position.

7. A vehicle including the assembly of claim 1.

8. A tailgate lift assembly, comprising:
a housing;
a spring anchored at one end at a first end of the housing;
a connector having a first end affixed to the opposite end of said spring and extending through said housing; and
first and second stationary guides for engaging the connector, each of the first and second stationary guides having a groove for engaging the connector, wherein the groove of the first stationary guide points in a first direction with respect to the housing and the groove of the second stationary guide comprises a wedge-shaped cut out and points in a second direction, opposite the first direction, with respect to the housing, the second stationary guide further comprising vertical side walls adapted to engage opposing side walls of the housing.

9. The assembly of claim 8, wherein the connector extends below the first stationary guide and above the second stationary guide.

10. The assembly of claim 8, further including a pair of fasteners for connecting each stationary guide to the housing.

11. The assembly of claim 8, wherein the first stationary guide is exposed to an open end of the housing through which the connector passes.

12. The assembly of claim 8, wherein the second stationary guide comprises inwardly sloping sides forming the groove of the second stationary guide, the inwardly sloping sides configured to form a center channel to loosely guide the connector.

13. The assembly of claim 8, wherein the first stationary guide is configured to keep the connector in an aligned position in relation to the housing, and the second stationary guide is configured to allow a deviation from the aligned position.

14. A tailgate lift assembly, comprising:
a housing;
a spring anchored at one end at a first end of the housing;
a connector having a first end affixed to the opposite end of said spring and extending through said housing;
first and second stationary guides at least partially within the housing, the first stationary guide including a first groove facing a first direction for engaging the connector and the second stationary guide including a second groove comprising synclinal walls, said second groove facing a second direction, opposite the first direction, for engaging the connector; and
at least one fastener for fixing the position of each of the first and second guides.

15. The assembly of claim 14, further including a pair of fasteners for fixing the position of one of at least the first and second stationary guides.

16. The assembly of claim 1, wherein the second groove comprises inwardly sloping sides configured to form a downwardly sloping center channel along the second stationary guide to loosely guide the connector.

\* \* \* \* \*

UNITED STATES PATENT AND TRADEMARK OFFICE
CERTIFICATE OF CORRECTION

PATENT NO. : 10,981,607 B2
APPLICATION NO. : 15/678630
DATED : April 20, 2021
INVENTOR(S) : Ralph Norfleet et al.

Page 1 of 1

It is certified that error appears in the above-identified patent and that said Letters Patent is hereby corrected as shown below:

On the Title Page

Item (63) - Please replace Oct. 19, 2017 with --- Oct. 19, 2016 ---

In the Claims

Column 10, Claim 5, Line 4 - Please delete "first"

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*